United States Patent [19]
Caridis et al.

[11] 4,251,895
[45] Feb. 24, 1981

[54] SURFACE WATER REMOVAL FROM POTATO SLICES

[75] Inventors: Andrew A. Caridis, Foster City; Anthony A. Caridis, Belmont; Clark K. Benson, Millbrae, all of Calif.

[73] Assignee: Heat and Control, Inc., San Francisco, Calif.

[21] Appl. No.: 77,662

[22] Filed: Sep. 21, 1979

[51] Int. Cl.³ .................................................. A23N 13/00
[52] U.S. Cl. ...................................... 15/3.13; 15/302; 15/306 B; 15/345; 99/352
[58] Field of Search ................... 15/3.13, 302, 306 B, 15/345, 346; 99/352

[56] References Cited
U.S. PATENT DOCUMENTS

| | | | |
|---|---|---|---|
| 2,666,711 | 1/1954 | Crosset | 15/3.13 X |
| 2,719,529 | 10/1955 | Wells | 15/3.13 X |
| 2,732,987 | 1/1956 | Moore | 15/3.13 X |
| 2,999,262 | 9/1961 | Jenkins et al. | 15/345 X |
| 3,223,024 | 12/1965 | Benson et al. | 99/404 X |
| 3,805,316 | 4/1974 | Sheppard | 15/346 X |
| 4,198,725 | 4/1980 | Trutzschler | 15/345 X |

Primary Examiner—Christopher K. Moore
Attorney, Agent, or Firm—Flehr, Hohbach, Test, Albritton & Herbert

[57] ABSTRACT

Surface water, potato pieces and starch particles are removed from raw potato slices as they are transferred from a water bath to a cooker on a perforate conveyor belt. Streams of air against the topside of the belt place the slices in turbulent motion and air suction through a grid on the bottom side of the belt extracts water and starch particles into a suction stream from which the particles are separated.

6 Claims, 5 Drawing Figures

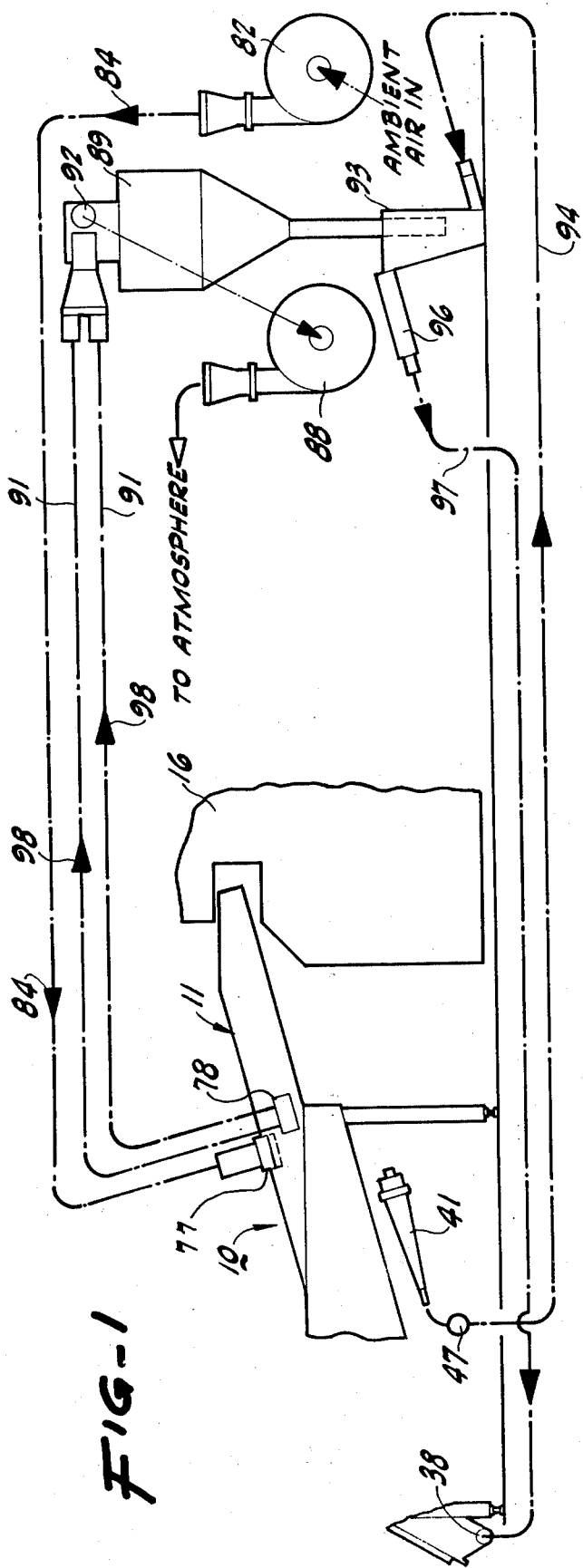
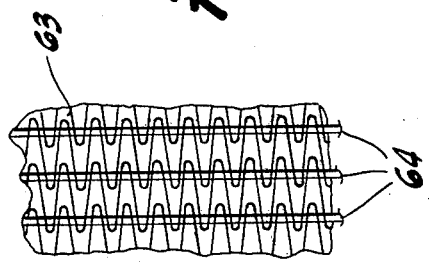
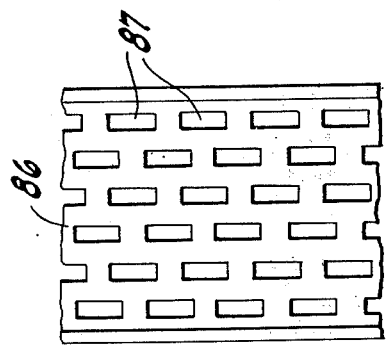

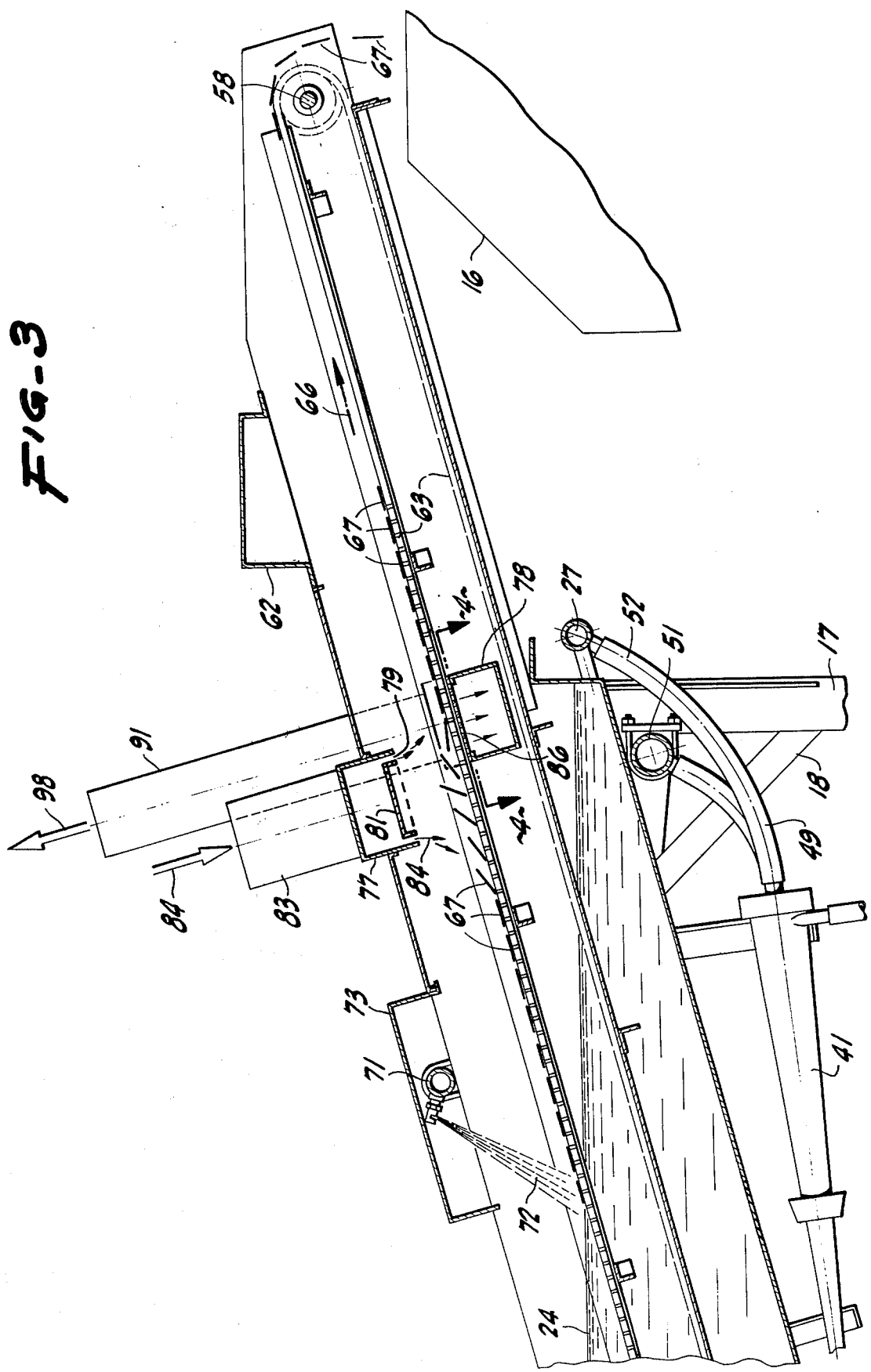

SURFACE WATER REMOVAL FROM POTATO SLICES

This invention relates to food washing prior to cooking and more specifically concerns an improved system for separating surface water, potato pieces and starch particles from potato slices before they are introduced into a cooker for making potato chips.

The preparation of potato chips from the raw potato is a multi-step process which includes potato peeling, slicing, washing and cooking in oil to the desired color and texture, then seasoning and packaging. It is desirable to realize increased efficiencies in any of these involved steps and it is particularly desirable to increase the efficiency of the potato slice cooker through reduction of fuel cost and oil consumption. If the potato slices as delivered from the washer are in a substantially drier state less fuel would be required than if the slices were wet which would required heat to vaporize the water transferred to the cooker from the washer. To approach this desirable goal requires removal of virtually all of the water carried forward by the potato slices as well as free starch on the sliced potato or particles of potato which may still adhere to the slices following washing.

The U.S. Pat. No. 3,223,024 which issued Dec. 14, 1965 on the application of Clark K. Benson and Andrew A. Caridis disclosed a highly effective food washing and cooking apparatus and disclosed air wiping means for directing high velocity jet streams of air at an angle so that they impinge upon the bottom and top surfaces of the potato slices and drive the excess surface water therefrom. The slices were held down upon the conveying belt by a hold-down belt while the high velocity jet streams impinged upon the slices. This procedure was efficient both with the hold-down belt and in its absence but it was believed that still further efficiencies could be achieved if still more water could be removed from the surface of the potato slices.

In summary, the invention includes a potato slice washer tank for holding potato wash water where potato slices are deposited for removing starch particles and the like from the surfaces. A discharge conveyor is arranged inclined with one end submerged in the tank with the other end above the water line for conveying potato slices from the washer tank to the cooker. The conveyor is provided with a perforate conveyor belt for water drainage and first air blowing means is arranged above the conveyor belt to propel air at a velocity to stimulate turbulence among the potato slices on the belt. Air suction means is arranged on the side of the belt opposite the air blowing means to extract water and starch particles from the zone of the air blower means when the potato slices are in a turbulent condition.

An object of this invention is to provide a highly efficient system for sweeping moisture from the surface of potato slices to thereby reduce the heat load on the potato slice cooker and improve its efficiency.

Another object of the invention is to provide an improved system for surface water removal from potato slices which reduces the amount of particulate matter including pieces of potato slices carried by the washed potato slices into the potato chip cooker.

Another object of the invention is to provide an improved potato chip conveying system for transporting potato slices from the washer to the cooker in a substantially moisture free state.

Further objects and advantages of the invention will become apparent from the detailed specification taken in connection with the drawings. FIG. 1 of the drawings is a fragmentary schematic view of the potato slice conveying system of the present invention;

FIG. 3 is a view on an enlarged scale of the upper end portion of the potato chip conveyor showing the air sweeping action on the potato slices;

FIG. 4 is an enlarged section view taken in the direction of the arrows 4—4 on FIG. 3 and;

FIG. 5 is a fragmentary section of the conveyor belt material useful in the present invention.

Figure 2:
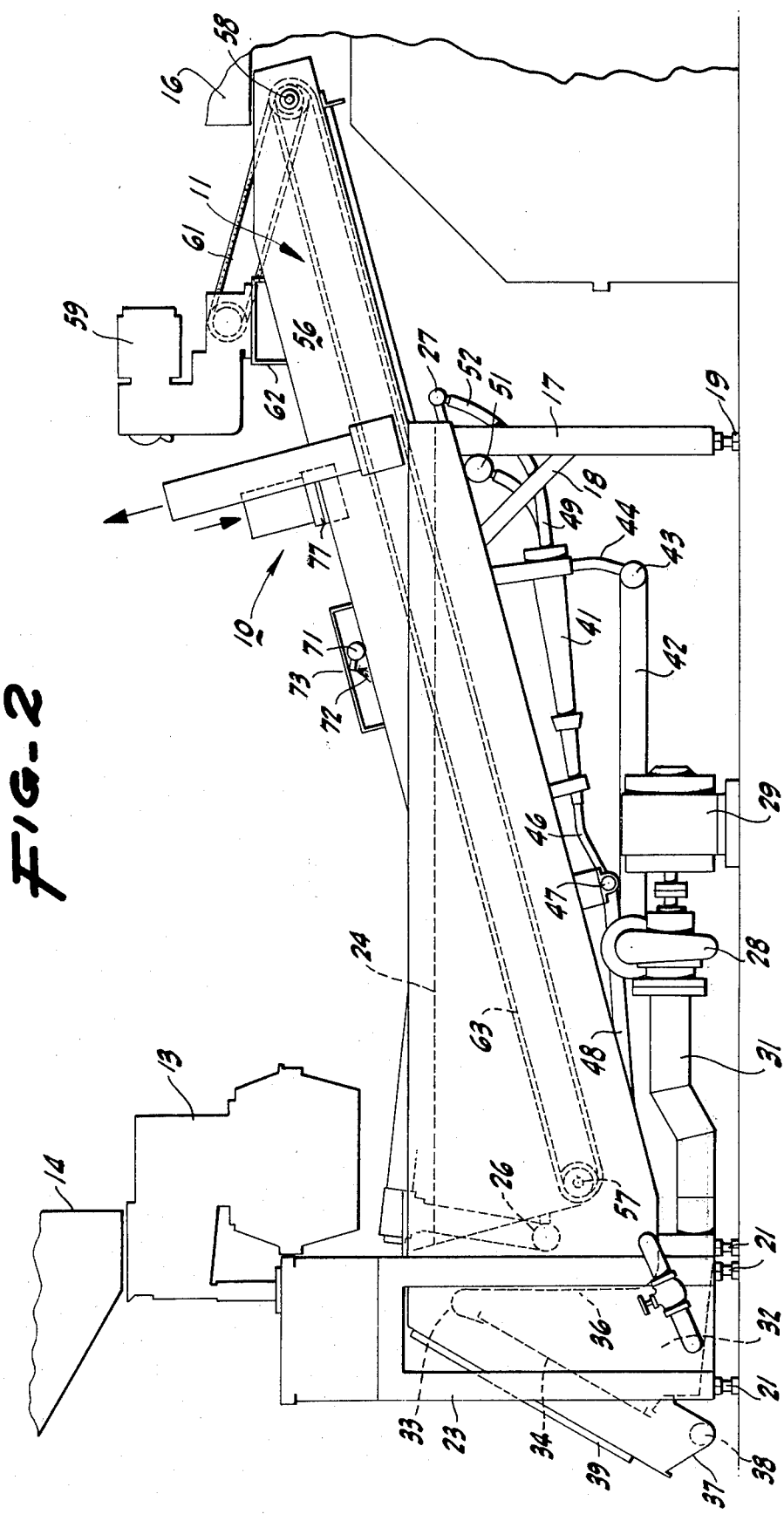
FIG. 2 is a side elevational view of the potato slice washer conveyor and portions of the cooker arranged in accordance with the principles of the present invention.

Referring to the drawings, the present invention is shown in its operating environment, particularly FIGS. 1 and 2, the invention comprising the surface water removal system 10 operatively mounted upon a potato slice conveyor 11 which serves to lift potato slices from a washer tank 12. Other components of the potato slice processing system will now be described to further a complete understanding of the overall process. These include at least one potato slicer 13 which is mounted above washer tank 12 at one end, and the slicer 13 receives a supply of potatos through a feed chute 14 in the raw but peeled condition. The potato slicer 13 discharges slices of the raw potato to the washer tank 12 for removal of starch and other undesirable particles such as partial slices of potato and water is maintained circulating in the tank 12 so as to move slices towards the conveyor 11 upon which the slices are passed through the surface water removal system to and are then moved by the conveyor 11 into the potato slice cooker 13 which may be constructed in accordance with the principles set out in co-pending U.S. Pat. applications Ser. No. 698,276 filed Jun. 21, 1976. The potato chip cooker 13 may also be constructed according to the disclosure in the Benson et al. U.S. Pat. No. 3,223,024 issued Dec. 14, 1965.

The potato slicer 13, potato feed chute 14, washer tank 12, and chip cooker 16 may be arranged as shown schematically in FIG. 1 and as illustrated in FIG. 2.

The washer tank 12 is rectangular in plan (not shown here) and in elevation may be constructed as shown at FIG. 2 to have a greater depth at the feed end adjacent to the potato slicer shown mounted to the left in FIG. 2 than at the discharge end which is on the right. The washer tank 12 may be supported at the discharge end by legs 17 having diagonal braces 18 insuring stability and leveling screws 19 for accommodating uneven floor surfaces. Stub legs 21 may be arranged on the deep or feed end of the tank 12 and may include adjustment provisions similar to those leveling screws 19. A subframe 23 at the feed end of the tank 12 serves as a mounting for the potato slicer 13. A pattern of water circulation is maintained in the tank 12 moving generally counter-clockwise as viewed in FIG. 2 so as to furnish a measure of scrubbing action on the potato slices and to cause water flow through the belt of the conveyor. More specifically, at the feed end of the tank 12 there is arranged beneath the water surface or nominal water level 24 a water feed manifold 26 and at the discharge end of the tank 12 there is arranged proximate to the water level 24 a second incoming water feed manifold 27. The water feed manifolds 26, 27 are coupled to a centrifugal pump 28 driven by a motor 29, the pump 28 taking its suction input through a pipe 31 from a sump 32 adjacent to the feed end of the tank 12. Within the sump 32 there is arranged a weir 33 for carrying overflow along a static screen 34. Water flowing over the weir 33 and across the screen 34 falls into a trough 37 where it may be carried off into a drain (not shown) by a conduit 38. Access to the static screen 34 may be obtained through the removable door sections 39.

To maintain cleanliness of the water contained within the tank 12 after a substantial period of washing potato slices, a centrifugal classification system is provided on the feed side of the pump 28 to concentrate the fines, starch particles, potato pieces, and other contaminants carried into the tank with potato slices. This system includes a battery of centrifugal classifiers 41 sometimes called in this art "hydrocyclones" or "hydro-clones." The battery of classifiers 41 may include 6, 8 or 10 identical units arranged in parallel so that a discharge conduit 42 from the pump 28 is coupled to a manifold 43 which supplies through conduits 44 the tangent inlets of the hydro-clones 41. The concentrated fines, etc. discharge at the apices of the hydro-clones 46 to a common manifold 47 which in turn leads to a drain 48. The center taps 49 of the centrifugal classifier 41 supply substantially clarified water to the two water feed manifolds 26 and 27 through the conduits 51 and 52 respectively.

Referring to FIGS. 2 and 3, the slice conveyor 11 includes side frame members 56 which are supported with respect to the washer tank 12 so that the conveyor 11 is inclined upwardly and outwardly from the tank 12 such that the discharge end of the conveyor is raised with respect to the body of water in the tank and thus supplies the potato slices to the associated chip cooker 16 at a higher elevation than the washer tank. An idler shaft 57 is provided between the side frames 56 at the lower end of the conveyor and a driven shaft 58 is mounted at the upper end of the conveyor unit and is driven from a motor and speed reducer unit 59 which supplies power to the shaft 58 through the drive chain 61 arranged as may be seen from FIG. 2. The drive motor and gear reduction unit 59 is mounted on a pedestal 62.

A conveyor belt 63 is reeved into upper and lower runs about the shafts 57 and 58 and a suitable belting material was found to be a stainless steel flat wire belt with 1"×1" equal openings having 11 gauge cross rods 64 (FIG. 5) with the margins of the belt provided with drive chain (not shown) for driving engagement with sprockets mounted on the shafts 57 and 58. The direction on driving motion of the conveyor 11 is indicated by the arrow 66 in FIG. 3 as upwardly out from the body of water contained within the washer tank 12 such that the top run of the conveyor belt carries potato slices 67 from the tank into the cooker 16.

Water spraying means 71 are arranged on the conveyor frame 56 for directing a spray 72 against the potato slices 67 on the upper run of the conveyor belt 63 as shown in FIG. 3. The transversely extending water spray tube 71 is coupled to a source of fresh water so as to furnish a flow of about 40 gallons a minute at about 30 psi in a plurality of discrete sprays 72 which also serve to furnish makeup water for the tank. A hood 73 is disposed to shield the spray and prevent a water mist from circulating into the surroundings. The function of the spray is to remove small particles of starch and foreign matter from the potato slices and from the conveyor belt 63 for reducing carryover into the chip cooker 16.

For efficiently removing surface water from the slices 67 and removing the remaining potato particles and starch elements from the slices and conveyor belt, an air sweeping system 10 is provided and includes an air pressure plenum 77 arranged transversely of and above the conveyor belt 63 and which serves to place the slices 67 in a turbulent or dancing state, and an air suction plenum 78 which serves to remove particles from the slices and from the atmosphere surrounding the slices as they are driven airborne from the belt 63. The air pressure plenum 77 supplies a blast of air against the belt through two slit orifices 79 defined by the side walls of the plenum 77 and a baffle plate 81. Referring to FIG. 1, a centrifugal fan 82 supplies air to the plenum 77 through a conduit 83 in the direction indicated by the arrows 84.

The air suction 78 is arranged immediately below the top run of the belt 63 which wipes across the upper surface of the plenum which is a perforate suction plate 86, shown best in FIG. 4. The suction plate 86 is provided with a plurality of rectangular openings 87 elongated transversely to the belt width. The openings 87 may be formed on the order of $\frac{3}{8}"\times 1\frac{1}{8}"$ and arranged in the plate to afford a substantial draft of air flowing both from the air pressure plenum 77, arranged immediately above one margin of the suction plate 86, and drawn from the surrounding zone containing potato slices 67, water and potato particles in turbulent motion. Air suction means includes a centrifugal fan 88, a particle separating cyclone 89 and the dual suction conduits 91, one being mounted at each end to the suction plenum 77, as illustrated in FIG. 1. The inlet of the centrifugal fan 88 communicates with the tangential inlet 92 of the cyclone 89 and the function of this combination is to remove from the air entrained through the suction plate 86 all the water, potato particles, starch particles, and the like debris which fall to the bottom of the cyclone 89 which is equipped with a water seal 93. The water seal 93 is connected to the apex manifold 47 of the hydroclone battery 46 by the conduit 94. A gravity filter unit 96 of the water seal 93 is coupled to a discharge line 97 communicating with the trough drain line 38 of the tank 12. The arrows 98 indicate the direction of air flow from the suction plenum to the cyclone 89. Thus a clean source of air is discharged to the atmosphere from the centrifugal fan 88 which receives a clean supply of air from the cyclone 89.

The operation of the washer equipped with the surface water removal system 10 is begun by first supplying the wash tank 12 with water to about the indicated water level 24 and actuating the circulating pump 28 as well as the slice conveyor motor drive 59. The fan unit 82 is actuated to supply air which is distributed through the air plenum 77 in curtains of air against the slices 37 and downwardly towards the suction plate 86 of the air suction plenum 78. The suction fan 88 is actuated to draw air in the direction of the arrows 98 through the suction plate 86 of the air suction plenum 78 for removing airborne particles of debris, potatoes, moisture, etc. and this has the effect of an air sweeping action upon the surfaces of the potato slices. The potato slices 67 are received in the tank 12 from the potato slicer 13 and are carried upwardly from the body of water in the tank into contact with the water spray 72 just as the slices leave the body of water in the tank. Then the slices encounter the curtains of air 84 which causes the slices to dance on the belt 63, as illustrated in FIG. 3, for a moment and then to be sucked against the belt when encountering the air moving in the direction of the arrows 98 through the suction plate 86. The conveyor belt 63 carries the potato slices forwardly in the direction of the arrow 66 for discharge from the conveyor 11 into the cooker 16.

It has been learned by providing a unit with the described combination of air pressure plenum and air suction plenum arranged as disclosed that the cooker efficiencies improved on the order from 7 to 11% in terms of less fuel required per pound of product.

Another advantage of the present arrangement is a lesser concentration of the fines in the washer unit by reason of the treatment of those fines in the hydrocyclones 41 for discharge in highly concentrated form to a designated discharge system thereby using less wash water. These features and advantages of the invention may be achieved by departing somewhat from the structures described herein but the invention shall be limited only to the matters set forth in the claims which follow.

What is claimed is:

1. In apparatus for preparing raw potato slices and delivering them to a cooker the combination comprising, a potato slice washer tank serving to contain a volume of water into which potato slices may be deposited for removing starch particles and the like therefrom, discharge conveyor means arranged with respect to said washer tank so that one end of the conveyor means may be disposed below the nominal water line with the other end of the conveyor means arranged above the nominal water line so as to permit delivery of potato slices from the washer tank to an associated cooking unit; said conveyor means including a perforate conveyor belt arranged so that water may drain therefrom as potato slices are conveyed from the tank to the associate cooking unit; air blowing means arranged above said conveyor belt in a portion thereof above the nominal water line and including air nozzle means disposed above said conveyor belt serving to direct at least one stream of air towards said conveyor belt, said air blowing means including an air blower coupled to said air nozzle means for supplying air through said air nozzle means to create a turbulent zone along said belt and at a force sufficient to lift potato slices from the conveyor belt so that the slices are airborne and in agitated motion during transfer on said belt through said zone; and air suction means arranged with respect to said conveyor belt opposite from said air nozzle means serving to permit extraction of water and starch particles, said air suction means including power suction means for drawing air through said conveyor belt so as to clear water off the potato slices, and means associated with said air suction means for separating from the air stream starch particles and other solid elements from the air and also separating out the water factors from the air stream.

2. The combination stated in claim 1 wherein said air suction means includes grid plate means arranged under said conveyor belt and including a plurality of nozzle means.

3. The combination stated in claim 1 wherein said last stated means includes a cyclone separator having a tangent outlet, said power suction means having a principal air inlet communicating with the tangent outlet of the cyclone, serving to deposit in the cyclone water, starch and potato particles drawn from the potato slices.

4. The combination stated in claim 1 wherein said air blowing means includes an air plenum arranged transversely of said conveyor belt, a lower wall portion of said air plenum having at least two open slits serving to define said air nozzle means and operative to furnish streams of air against the potato slices on the conveyor belt.

5. Apparatus for treating potato slices during transfer from a potato slice washer to a slice cooker, comprising conveyor means including a perforate conveyor belt operative to transport raw potato slices from the slice washer for deposit in the slice cooker, air blowing means spaced from said conveyor belt and serving to generate a zone of air turbulence along the top surface of said conveyor belt serving to place the slices in said zone into random airborne motion, air suction means disposed adjacent to the under surface of said conveyor belt and permitting suction of air through said belt, power suction means coupled to said air suction means for drawing air through said conveyor belt for sucking said potato slices forcefully against the conveyor belt, said air suction means including grid-like means equipped to receive therethrough water, potato and starch particles cleared from said potato slices.

6. A combination defined in claim 5 wherein said power suction means includes particle separation means serving to remove from the suction air stream water, starch and potato particles swept from the potato slices.

* * * * *